Oct. 11, 1960 J. O. HRUBY, JR 2,955,764
SPRINKLER
Filed Jan. 24, 1958

JOHN O. HRUBY, JR.
INVENTOR.

By Huebner and Worrel
ATTORNEYS

United States Patent Office 2,955,764
Patented Oct. 11, 1960

2,955,764
SPRINKLER

John O. Hruby, Jr., Burbank, Calif., assignor, by mesne assignments, to Rain Jet Corporation, Burbank, Calif., a corporation Filed Jan. 24, 1958, Ser. No. 710,988

10 Claims. (Cl. 239—206)

This invention relates to fluid discharging devices which are especially well suited for employment as lawn sprinklers of the type for distributing water over a semi-circular or other predetermined sector of lawn area.

It is an object of this invention to provide an improved fluid discharging device for spraying fluid inwardly from and along a side or sides of an area as, for example, a lawn sprinkler for spraying water upon a lawn from an edge of the lawn and not upon a sidewalk or other area adjoining the lawn.

Another object of this invention is to provide an improved lawn sprinkler which is of the "pop-up" type, i.e. adapted to extend upwardly when spraying water and to drop down when the water supply is turned off, to a position where the sprinkler will be protected from damage by traffic over the lawn.

Still another object of this invention is to provide a fluid discharging device having an improved structure for filtering sand and other particles from the fluid supply thus to prevent such particles from entering the discharging device and from impairing it in its operation.

Another object of this invention is to provide a lawn sprinkler of the above mentioned type and which is so designed and constructed that it may be manufactured easily and economically.

Further objects and advantages of the invention will appear during the course of the following part of this specification wherein the details of construction and mode of operation of a preferred embodiment of the invention are described with reference to the accompanying drawing, in which.

Figure 1:
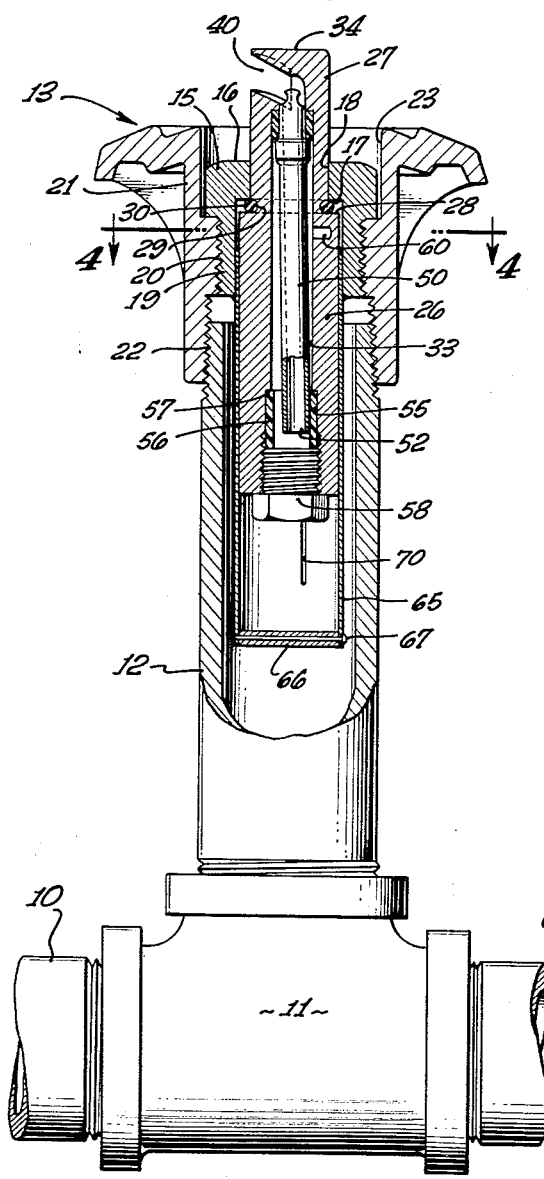
Fig. 1 is a central vertical section through a sprinkler embodying the invention, the sprinkler being mounted on a riser of a lawn sprinkler system.
Figure 2:
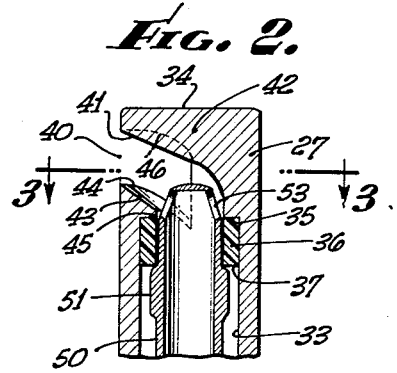
Fig. 2 is a central vertical section through the upper end portion of the sprinkler, on an enlarged scale.
Figure 3:
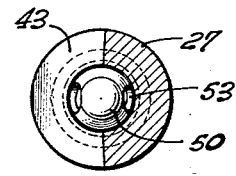
Fig. 3 is a transverse section through the same taken on line 3—3 of Fig. 2.

Referring to the drawing in detail, a conduit of a lawn sprinkler system is shown and designated by reference numeral 10. Such conduit includes a pipe-T 11 for receiving a vertically extending riser 12. A lawn sprinkler, embodying the invention is mounted in the riser, the sprinkler being designated generally by numeral 13.

The sprinkler 13 comprises a cap 15 having an upper surface 16, an undersurface 17 and an opening 18 extending axially therethrough, the side walls of the opening being cylindrically and, in the illustrated embodiment, circular in cross section. The cap has a skirt 19 which is externally screw-threaded as at 20 for mounting the cap atop the riser 12. A casting 21 serves to mount the cap upon the riser as by screw threads 22 on the inside of the casting for mating with screw threads on the upper end of the riser. The casting has a recess 23 formed therein for receiving the cap, thus to position the cap below the upper flanged surface of the casting.

Reference numeral 26 designates the body of the sprinkler. The upper end portion 27 of the body is cylindrical and circular in cross section, and the diameter thereof is just slightly less than that of the cap opening 18 whereby the body is movable longitudinally in the cap with the upper end portion of the cap extending into the cap opening.

Figure 4:
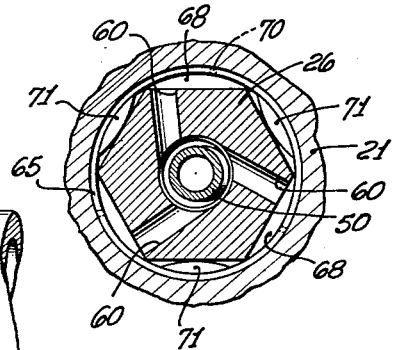
Fig. 4 is a transverse section through the sprinkler taken on line 4—4 of Fig. 1.

The lower end portion of the body, i.e. that portion thereof disposed inwardly of the cap, is out-of-round in cross section for purposes which will appear more fully hereinafter. As best shown in Fig. 4 the outside surface of the lower end portion of the illustrated embodiment of the body is hexagonal in cross section thereby to define an upwardly facing annular shoulder 28 between the lower end portion of the body and the upper end portion 27 of the body, the upper end portion being smaller in diameter than the lower end portion. There is a groove 29 formed around the body adjacent the shoulder 28, and this groove receives a seal ring 30. Upward axial movement of the body and the cap opening 18 brings the seal ring 30 into engagement with the under surface of the cap around the rim of the cap opening thereby to prevent water from flowing around the body and up through the cap opening.

The body has an axially extending bore or cavity 33 formed therein. Such cavity does not extend through the upper end surface 34 of the cap. Proximate the upper end of the body, the bore 33 is of smaller diameter than the remaining portion of the bore thereby providing a downwardly facing annular shoulder 35. A tubular sleeve 36 having a lower annular shoulder 37 is fitted into the bore through the lower end of the bore to fit up against the shoulder 35 in the body.

The side wall of the upper end portion of the body has a transversely extending slot 40 which in the illustrated embodiment extends beyond the axis of the bore 33. This slot constitutes an outlet opening for water from the body. It extends inwardly of the body at a slight angle with respect to the axis of the body such that the slot opens in a direction slightly upwardly from a horizontal plane. The slot is defined by an upper side wall 41 which faces downwardly thereby defining a lip 42 which extends transversely over the upper end of the bore 33.

The lower side wall of the slot 40 is designated by numeral 43 and it is concave in configuration, i.e. the outer edge 44 thereof, as defined by the side walls of the body, is disposed upwardly of the inner edge 45 thereof defined by the bore 33. Likewise the upwardly disposed side wall of the slot 40 is arcuate in configuration it being generally convex and substantially parallel to the surface of lower side wall 43 of the slot, such that the edge 46 along which the side wall 41 meets the side wall of the body, is disposed upwardly of the center of the slot.

Arranged longitudinally in the bore of the body is tubular stem 50. The stem is rotatable on its axis and is gyratable around in the body in a manner which will be explained more fully hereinafter. The stem has a collar 51 around the outside surface thereof proximate the upper end of the stem. This collar by abutment with the shoulder 37 of the sleeve 36 limits upward movement of the stem in the body. The lower end of the stem is open as shown at 52 whereby water may pass from the body into the stem. At its upper end the stem has two outlet orifices 53 spaced opposite each other and these are disposed on the stem at a position where they will be fully exposed in the slot 40 of the body when the collar 51 is engaged with the shoulder 37 of the sleeve 36.

At its lower end the body has a counter bore 55 which receives a sleeve 56, there being an annular shoulder 57 provided by the counter bore against which the upper end of the sleeve 56 abuts. This sleeve 56 is of an axial length such that it extends upwardly beyond the inlet end opening of the stem when the stem is moved upwardly to a position where the collar 51 thereof abuts the upper sleeve 57. A plug 58 closes the lower end of the body and serves to retain the lower sleeve 56 within the counter bore.

Water passes into the body from the riser 12 through openings or ports 60 formed in the side wall of the body. The bore 33 is opened to the flow of water from the riser through ports 60 formed in the side wall of the body. In the illustrated embodiment there are three such ports and these are disposed tangentially with respect to the bore 33 whereby water passing through the ports 60 will cause water to swirl around in the bore.

Though I have shown the ports 60 as being inclined with respect to the radii of the bore 33 it is not necessary that the ports 60 be so inclined or be inclined at all, i.e. they may extend radially through the side walls of the body as is explained fully in an application for Letters Patent which I am filing contemporaneously herewith. The openings 60 need not be ports of small diameter, but may be relatively large openings, so large, in fact, that the side walls of the body are substantially removed, there being only so much of the side walls remaining as to suspend the lower end portion of the body surrounding the lower sleeve 56 as a cup into which the lower end of the stem is received. The openings 60 must at least be above the upper rim of such cup, i.e. above the upper annular end of the lower sleeve 56, which in turn is disposed above the lower end of the stem.

In operation water enters the body bore through the openings 60 and flows downwardly into the lower end portion or cup of the body and then upwardly through the stem and out through the orifices 53 of the stem. Such downward and thence upward flow of the water imparts gyratory motion to the lower end of the stem whereby the lower end of the stem revolves around and inside of the sleeve 56. This gyratory movement of the stem results in a corresponding gyratory movement of the upper end of the stem in the slot 40 and inasmuch as the collar of the stem bears against the upper sleeve 36 the upper end of the stem describes a circle. In being so gyrated with the axis of the stem inclined with respect to the axis of the bore 33, the stem is caused to roll along the inside surface of the sleeve 56 and to rotate on its axis, with the result that first one and then the other of the outlet orifices 53 are directed outwardly toward the opening of the slot 40. The sleeves 36 and 56 are preferably formed of wear resistant laminated phenolic composition to increase the life of the sprinkler.

When water to the sprinkler system is turned off, the sprinkler body drops downwardly in the cap opening 18 and preferably to a position such that the slot 40 is covered by the side walls which define the cylindrical opening 18 of the cap, and with the plane of the upper end 34 lying in the plane of the upper surface of the cap.

To prevent the body from dropping out from the cap opening, there is provided a cylinder 65 welded or otherwise suitably attached at its upper end to the skirt of the cap, the lower end of such cylinder being closed as by a plate 66 held therein as with a pin 67. The hexagonal cross sectional outline of the body defines passageways 68 around the body and these as shown in Fig. 4 communicate with the openings 60 in the side walls of the body.

Water passes into the cylinder 65 through longitudinal slits 70 formed therein. These slits are relatively narrow and serve to filter out sand and other solid particles that may be carried in the water from the riser 12 thus preventing such particles from entering the sprinkler body where they may become lodged and impair gyration and rotation of the stem in the body. I have found that the longitudinally extending slits in the cylinder provide better filtering results than do small holes, for in the case of small holes, they become clogged with solid particles, whereas in the case of slits the inlet capacity of the slits is not substantially affected by particles caught therein. Also these slits may be formed by stamping them in a sheet of metal, which may then be formed into a cylinder.

To prevent the body from rotating in the cap, the cylinder 65 has detents 71 formed therein to engage the outside surface of the side walls of the body and still permit longitudinal movement of the body in the cylinder.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

What I claim is:

1. A fluid discharge device adapted to be mounted in a fluid supply pipe and comprising a cap having an outer surface and an opening extending therethrough, a body having an outer end and an inner end, the outer end portion of the body extending into said cap opening, the body having a cavity formed therein extending from within the outer end portion of the body to within the inner end portion of the body, said outer end portion having an outlet opening formed therein and in communication with said cavity, the body being movable axially in said cap opening to a fluid discharging position in which said outlet opening is spaced outwardly of the outer surface of the cap, stop means on said body for limiting outward movement of the body in the cap opening beyond said fluid discharging position, a tubular stem disposed in said cavity, the stem having an outer end disposed within the outer end portion of the body and an inner end disposed within the inner end portion of the body, the stem having a fluid inlet opening formed in the inner end portion thereof and a fluid outlet orifice formed in the outer end portion thereof for flow of fluid from the stem out through said stem orifice and out through said outlet opening of the body, stop means in said body cavity and stop means on the stem abuttable against said stop means in the cavity for maintaining the stem in the cavity, the stem being rotatable on its axis, the body having an inlet opening formed therein for admitting fluid from outside the body to said cavity, said inlet opening for the body being spaced in an outward direction from the inlet opening of the stem and spaced in an inward direction from the inner surface of the cap.

2. A fluid discharge device according to claim 1 in which said body inlet opening is disposed at an angle with respect to the radii of the body cavity thereby to impart a swirl to fluid in the cavity.

3. A fluid discharge device according to claim 1 in which the outer end portion of the body comprises a lip extending transversely of and spaced outwardly from said stem orifice for deflecting fluid from said orifice as a spray into a sector of predetermined angle.

4. A fluid discharge device according to claim 1 and comprising a cylinder telescopically received over the inner end portion of the body, said cylinder having narrow openings formed therein for admitting fluid to said body inlet opening and for filtering solid particles from said fluid.

5. A pop-up type lawn sprinkler adapted to be mounted in a riser of a lawn sprinkler system and comprising a cap having an upper surface and an under surface and a cylindrical opening extending axially therethrough, means for securing the cap atop said riser, an elongate body having side walls and a lower end portion disposed below said cap and a cylindrical upper end portion extending into said cap opening, the body having an outlet opening formed in said upper end portion, the body having a bore extending axially therein and substantially in axial alignment with said cap opening, said bore being substantially closed at its lower end and being in communication with said outlet opening of the body, the body being movable axially in said cap opening to a pop-up position in which said outlet opening is disposed above the upper surface of said cap, first stop means on the body for limiting upward movement of the body in the cap opening beyond said pop-up position, a tubular stem arranged longitudinally in said body bore and adapted to be rotated on its axis and gyrated around in the body bore, the stem having an upper end disposed within the upper end portion of the body bore and a lower end disposed within the lower end portion of the body bore, the stem having a water inlet opening formed in the lower end portion thereof and a water outlet orifice formed in the upper end portion thereof, said outlet orifice being in direct communication with said outlet opening of the body during at least a phase in the rotation of the stem on its axis, second stop means on the body extending into said body bore and proximate said outlet opening of the body, stop means on the stem abuttable with said second stop means on the body for limiting upward movement of the stem in the body, the body having an inlet opening formed in the side walls thereof for admitting water from said riser to said body bore, said inlet opening of the body being spaced above the level of said inlet opening of the stem and spaced below the undersurface of the cap when said body is disposed in said pop-up position, and means associated with the cap for preventing rotation of the body.

6. A lawn sprinkler according to claim 5 in which said first stop means on the body comprises a seal ring around the body engageable with the lower rim of the cap opening for preventing flow of water around the body and out through the cap opening.

7. A lawn sprinkler according to claim 5 in which said second stop means on the body comprises a sleeve fitted coaxially in the body bore, said sleeve having a downwardly facing annular shoulder against which said stop means on the stem abuts.

8. A lawn sprinkler according to claim 5 and including a bearing sleeve disposed coaxially in the lower end portion of the body bore and around the lower end of the stem thereby to provide a cylindrical surface along which the lower end of the stem may roll as the stem is gyrated in the body.

9. A lawn sprinkler according to claim 5 in which said means for preventing rotation of the body comprises a cylinder disposed around the lower end portion of the body and secured to said cap, the outside surface of the body side walls being out-of-round and cylindrical, said cylinder having a detent extending inwardly from the inside wall thereof for engagement with the outside surface of the body thereby to prevent relative rotation of the body within the cylinder.

10. A fluid discharging device for mounting in an opening in a fluid supply pipe and comprising: a cap having an opening extending therethrough, the cap being adapted to be secured to said pipe over the pipe opening; a body having an outer end and an inner end, the outer end portion of the body extending into said cap opening, the body having a cavity formed therein, said outer end portion of the body having an opening formed therein in communication with said cavity, the body being moveable axially in said cap opening to a fluid-discharging position in which the outlet opening of the body is spaced outwardly of the outer surface of the cap; inter-engageable means on the body and the cap for maintaining the body against outward removal through the cap opening beyond said fluid-discharging position; a tubular stem disposed in said cavity, the stem having an outer end portion disposed in the outer end portion of the body and having an inner end, the stem having a fluid inlet opening formed in the inner end portion thereof and having a fluid outlet orifice formed in the outer end portion thereof for flow of fluid from the stem out through said stem orifice; inter-engageable means on the stem and the body for maintaining the stem against outward removal through the outer end opening of the body, the stem being rotatable on its axis; the body having an inlet opening formed therein for admitting fluid from outside the body to said cavity; and means operatively associated with the cap for limiting inward movement of the body from out the cap opening.

References Cited in the file of this patent

UNITED STATES PATENTS

| | | |
|---|---|---|
| 1,559,655 | Thompson | Nov. 3, 1925 |
| 1,639,220 | Elder | Aug. 16, 1927 |
| 1,954,863 | Coles et al. | Apr. 17, 1934 |
| 2,626,836 | Herron | Jan. 27, 1953 |
| 2,639,191 | Hruby | May 19, 1953 |
| 2,785,005 | Thompson | Mar. 12, 1957 |
| 2,823,952 | Hruby | Feb. 18, 1958 |